United States Patent [19]

Margus, Jr.

[11] 4,157,061
[45] Jun. 5, 1979

[54] PROCESS AND APPARATUS FOR COOKING

[75] Inventor: Albert F. Margus, Jr., Boca Raton, Fla.

[73] Assignee: Continental Seafoods, Inc., Secaucus, N.J.

[21] Appl. No.: 794,033

[22] Filed: May 5, 1977

[51] Int. Cl.² .............................................. A47J 27/08
[52] U.S. Cl. ........................................ 99/352; 99/371
[58] Field of Search ............... 99/352, 323.5, 331–332, 99/345, 355, 371, 467, 364; 126/25 R, 25 A; 432/107, 112; 426/523, 524

[56] References Cited

U.S. PATENT DOCUMENTS

| 731,573 | 6/1903 | Johnson | 99/352 X |
|---|---|---|---|
| 1,800,247 | 4/1931 | Buckbee | 432/112 X |
| 1,890,642 | 12/1932 | Edwards | 99/352 |
| 2,101,417 | 12/1937 | Waldvogel | 99/355 X |
| 2,602,134 | 7/1952 | Nelson | 99/323.5 X |
| 3,098,509 | 7/1963 | Bagnall | 432/112 X |
| 3,146,109 | 8/1964 | Frondorf | 99/467 X |
| 3,532,049 | 10/1970 | Smith et al. | 99/371 |
| 3,818,818 | 6/1974 | Hice, Sr. | 99/331 X |

FOREIGN PATENT DOCUMENTS

107089  1/1939  United Kingdom ............ 99/323.5

Primary Examiner—Harvey C. Hornsby
Assistant Examiner—Arthur O. Henderson
Attorney, Agent, or Firm—Henry L. Brinks; Joan I. Norek

[57] ABSTRACT

An improved assembly for moveably supporting food to be cooked in a pressure vessel is provided which assembly includes a rotatable food container and a rotation means therefore which increases the heat exchange between the food and the environment within the pressure vessel. Also provided is an apparatus for cooking food which includes a pressure vessel; heating and cooling means, a rotatable food container and a rotation means therefore which provides a more uniform processing of the food and increases the capacity of the pressure vessel with respect to the bulk of food which can be cooked in a single cycle. An improved process is also provided which includes subjecting the food to pressure, heating the food while maintaining the pressure, rapidly cooling or freezing the food while the pressure is maintained at least during the first portion of the cooling or freezing step while, at least during a part of the cycle, the food is falling intermittently through the atmosphere.

16 Claims, 11 Drawing Figures

PROCESS AND APPARATUS FOR COOKING

BACKGROUND OF THE INVENTION

This invention relates to an improved process and apparatus for cooking moisture-containing food and an improved assembly for moveably supporting food while being cooked in a pressure vessel and more particularly, to a process and apparatus and assembly for cooking food in a gaseous atmosphere under controlled temperature and pressure conditions wherein heat transfer is provided resulting in improved efficiency of processing and increasing the bulk of food that can be processed during one cycle per given pressure vessel.

Cooking moisture containing food such as meat, poultry, seafood, vegetables and the like in a non-liquid environment is known in the art for example the apparatus and method disclosed in U.S. Pat. Nos. 3,818,818 and 3,672,908. These patents disclose a cooking apparatus which is a pressure vessel or retort type including heating means, pressurizing means, and cooling means, each being operable independently of the other and a method of cooking including applying pressure to the food in a gaseous atmosphere prior to the application of heat, applying heat to the food while maintaining the pressure, rapidly cooling the food, and releasing the pressure. The use of the method and apparatus disclosed in these patents tends to reduce loss of moisture from the food during the heating and/or cooling cycle, retards bacterial growth after the heating cycle, and keeps the food integral.

The general practice in the art as disclosed in these patents is to support the food on a rack or a platform during the various processing steps or, when a continuous process is desired, on a moving conveyor. The use of such method or apparatus has serious disadvantages, particularly when the food being cooked exists in relatively small units, such as most vegetables or seafood products like clams or shrimp. It is the general practice to arrange such food to be processed on a series of trays, which trays must be placed apart within the processing vessel to allow sufficient heat exchange for the heating and/or cooling cycle. Placing apart a plurality of trays nessecitates providing a large ratio of space within the vessel to bulk of the food to be processed. Further, placing food to be processed on trays or other supporting platforms often results in a lack of uniformity in the extent of cooking.

It is the object of the present invention to provide an apparatus and method of cooking food in a gaseous environment wherein the heat exchange between the food to be processed and the heating and/or cooling means is improved.

It is further object of the present invention to provide a method and apparatus for cooking moisture containing food in a pressure vessel wherein pressure is applied to the food in a gaseous atmosphere prior to the application of heat, heat is applied to the food while maintaining the pressure, the food subsequently is rapidly cooled or frozen, and the pressure is released subsequent to the initiation of the cooling and freezing cycle wherein the heat exchange between the food being processed and the heating and cooling or freezing means is improved, resulting in an increased uniformity of the processing.

It is a further object of the present invention to provide an assembly and method for cooking food in a gaseous environment within a pressure vessel wherein the ratio of the space necessary in the cooking area to the bulk of food being cooked per cycle is greatly decreased.

It is a further object of the present invention to provide a method and apparatus for cooking moisture containing food in a pressure vessel in a non-liquid environment wherein the cooking area consists of an assembly which includes a rotable food container and rotation means therefore whereby food intermittently falls through the non-liquid environment during at least a part of the process period.

SUMMARY OF THE INVENTION

These and other objects are accomplished by the present invention which provides a method of cooking food in a gaseous environment wherein pressure is applied to the food prior to heating the food above ambient temperatures, heat is applied to the food while maintaining the pressure, heat is subsequently rapidly reduced, the pressure is released subsequent to the initiation of the reduction in heat, and the food intermittently falls through the gaseous environment during at least a part of the entire process.

The objects are accomplished by the present invention which also provides an apparatus for cooking moisture containing foods, which includes a pressure vessel, a means for introducing gas under pressure, a means for heating the contents of the vessel, a means for cooling the contents of the vessel, a means for causing the food to fall intermittently through the atmosphere, and a means for controlling independently or in a designated cycle the functioning of the components of the apparatus.

The objects are accomplished by the present invention which also provides an assembly for moveably supporting food within a pressure vessel which includes a rotable food container and a rotation means therefore which assembly acts upon the the food contained therein to cause such food to intermittently fall through the atmosphere.

When food is cooked in a gaseous environment and is first subject to pressure prior to heating which pressure is maintained during heating, the loss of food moisture during the heating phase is minimized and the nutritional and flavor value of the food is retained. Loss of food volatiles is further prevented when the food is chilled or frozen rapidly after the heating phase is completed. The loss of volatiles during the process is further assured by maintaining the pressure until after initiation of the cooling or freezing cycle whereby the depressurization does not occur until the temperature of the food is reduced at least to 100 degrees F. Pressurization increases the boiling temperature of the food volatiles and therefore prevents vaporization during the phases of the processing cycle wherein the food temperatures are above normal room temperature. Because it is desirable that the boiling points of the volatiles be increased during all times when the food is subjected to raised temperatures, the pressure cycle beings prior to the heating cycle and ends after the initiation of the cooling or freezing cycle. Depressurization can occur either during the cooling or freezing cycle or subsequent thereto. The method of cooking the food therefore requires application of pressure substantially through out the process and a suitable apparatus therefore includes a pressure vessel. The method must therefore be carried out within an enclosed and therefore spacially restricted area. The rotable food container and rotation means provided by the present invention maximizes the bulk of food that can be processed during a cycle and increases uniformity of the cooking both of which advantages are derived from the improved heat exchange provided by such assembly.

The rotable food container and rotation means allow the food to intermittently fall through the atmosphere and allow a rapid exchange of heat between the food and heating or cooling means, in a manner similar to stirring foods being cooked in a liquid environment, while retaining all of the advantages of cooking in a gaseous environment. The increase in heat exchange permits a reduced allowance of space in the vessel per unit of bulk of the food as compared to the space necessary when the food is disposed on a plurality of stationary platforms. Per given pressure vessel, the bulk of food that can be processed during one cycle can be increased up to about 50 percent or more as compared to assemblies wherein the food remains stationary. The increased exchange of heat between the food and the heating and cooling elements also assures a more uniform cooking and cooling of the food.

The former practice results in a situation where any improvements of two factors, bulk of food processed and uniformity of the processing, are opposed to one another. Increasing bulk of food processed reduced the uniformity of the processing and greater uniformity could be achieved only by reducing the bulk. The rotable food container and rotation means of the present invention results in an improvement of both of these factors simultaneously.

The rotable food container can be of any configuration suitable for the pressure vessel to be utilized. In a preferred embodiment of the present invention, the rotable container is a cylindrical drum which rotates about its principal axis.

The rotable drum is preferably provided with internal baffles extending from end to end which facilitate the lifting and falling of the food through the atmosphere environment by preventing the food from sliding along the internal walls of the drum for any appreciable distance. As the drum rotates, gravitational forces cause the food first to be lifted and then to fall from the upper portion to the lower portion of the drum at which point it will again be rotated to the upper position to be drawn downwardly again, resulting in intermittent falling which continues as the drum is being rotated. The drum is preferably perforated to allow circulation of the gaseous environment throughout the internal areas of the drum.

In a preferred embodiment, the internal dimensions of the pressure vessel are adapted to minimize the space surrounding the rotable food container. For instance, when the rotable container is a cylindrical drum, the internal shape of the pressure vessel also approximates a cylinder which arrangement not only maximizes the bulk of the food that can be processed relative to the space provided, but also decreases the atmospheric medium present during the processing which leads to a further increase in the efficiency of heat exchange.

The present invention includes a method and apparatus wherein the heating element and cooling element are located within the pressure vessel but outside the rotable food container. A preferred embodiment of the present invention however, provides for the introduction of the heating means and/or cooling means directly into the rotable container. For instance, when heat is provided by means of free steam and when cooling is provided by means of spraying a cooling agent, its function can be effectuated by providing suitable conduits with adjustable nozzels which extend into the container. The rotable food container is preferably adapted with an opening through which the conduit can extend and the nozzle can be deposed internally of the rotable container. When the rotable container is a cylindrical drum, an opening in one of its ends aligned with its principal axis allows the conduit to extend into the drum. Any space allowance between the edges of the aperture and the conduit extending through the aperture can be covered, such as by a flexible flap to avoid the possibility of the food passing therethrough during the processing.

The pressure is applied by introducing a pressurized inert gas, such as nitrogen, helium, or other suitable pressurized fluid.

The heat required for the cooking cycle can be provided by any convenient means such as electrical elements which can be used to heat a water reservoir located within the pressure vessel, steam jackets, or free steam which can be generated outside the pressure vessel and transmitted and released within the vessel by means of any suitable conduit. Heat need not always be applied throughout the cooking cycle. In many instances it will be found desirable to apply the heat only until the upper layers of the food reach a temperature sufficient to allow the heat to penetrate inwardly through the internal portions of the food.

Cooling or freezing may also be effectuated by any suitable means such as by spraying the food directly with a cooling agent such as cold water, liquid nitrogen, carbon dioxide, freon, or any suitable cryogenic material. Alternatively, the cooling may be had by circulating a refrigerant within suitable coils or providing a jacket with a cooling agent. The depressurization of the vessel can take place during the cooling or freezing cycle or thereafter. It is however preferable that the vessel is not depressurized prior to reducing the temperature of the food to at least 100° F.

The present invention also provides an assembly adapted to increase heat exchange with the respect of food while the food is being cooked in a pressure vessel which assembly includes a rotable food container and a means for rotating the container. In a preferred embodiment, the rotable food container is a cylindrical drum as described above. The rotation means may include a support means for the rotable container and a drive assembly. In a preferred embodiment, particularly when the food container is a cylindrical drum, the support means includes a cage and optionally a rotable cylindrical casing into which the drum is postioned prior to cooking. In such an embodiment, either the casing or the drum would be interconnected to the drive assembly. The cage may include two rings positioned spaced apart in coaxial alignment with a plurality of roller bars extending between. The roller bars would be horizontally mounted to rotate freely. The rings together with the roller bars from the cage approximating a cylinder into which the drum or casing is placed. One of the rings can be adapted to include a rotable sprocket which engages both the drum or casing and the drive assembly. As the sprocket is rotated by the drive assembly, the drum or casing is rotated therewith. The freely rotating roller bars of the cage guide the rotation of the drum or casing.

The invention and its objects, method of operation, features and advantages will be more fully understood by reference to the following drawings and the detailed description.

DETAILED DESCRIPTION OF THE INVENTION

Figure 2:
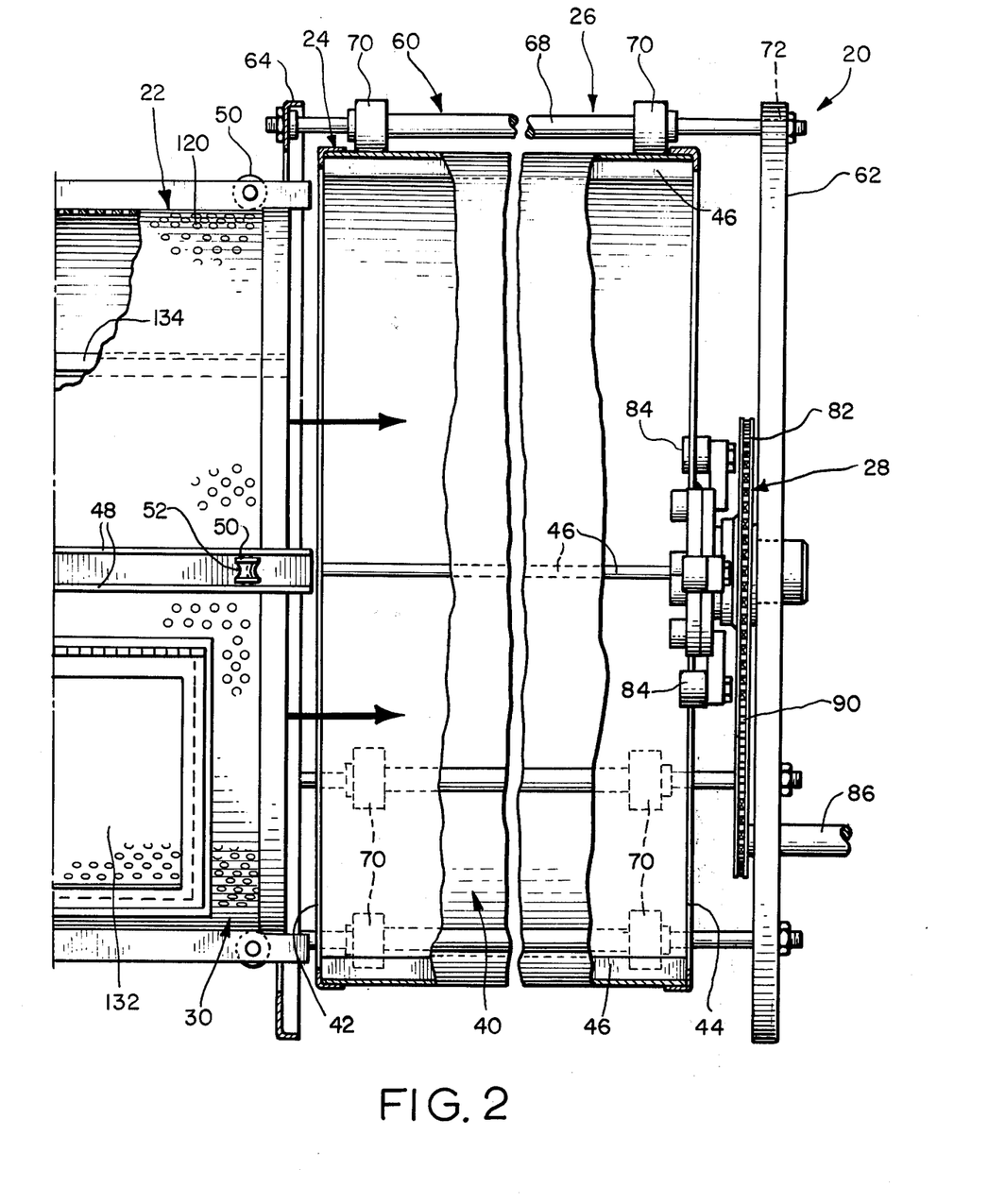
FIG. 2 is a sectional, partially cut-away side view of an assembly embodying features of the present invention.
Figures 3, 4, 5, 6:
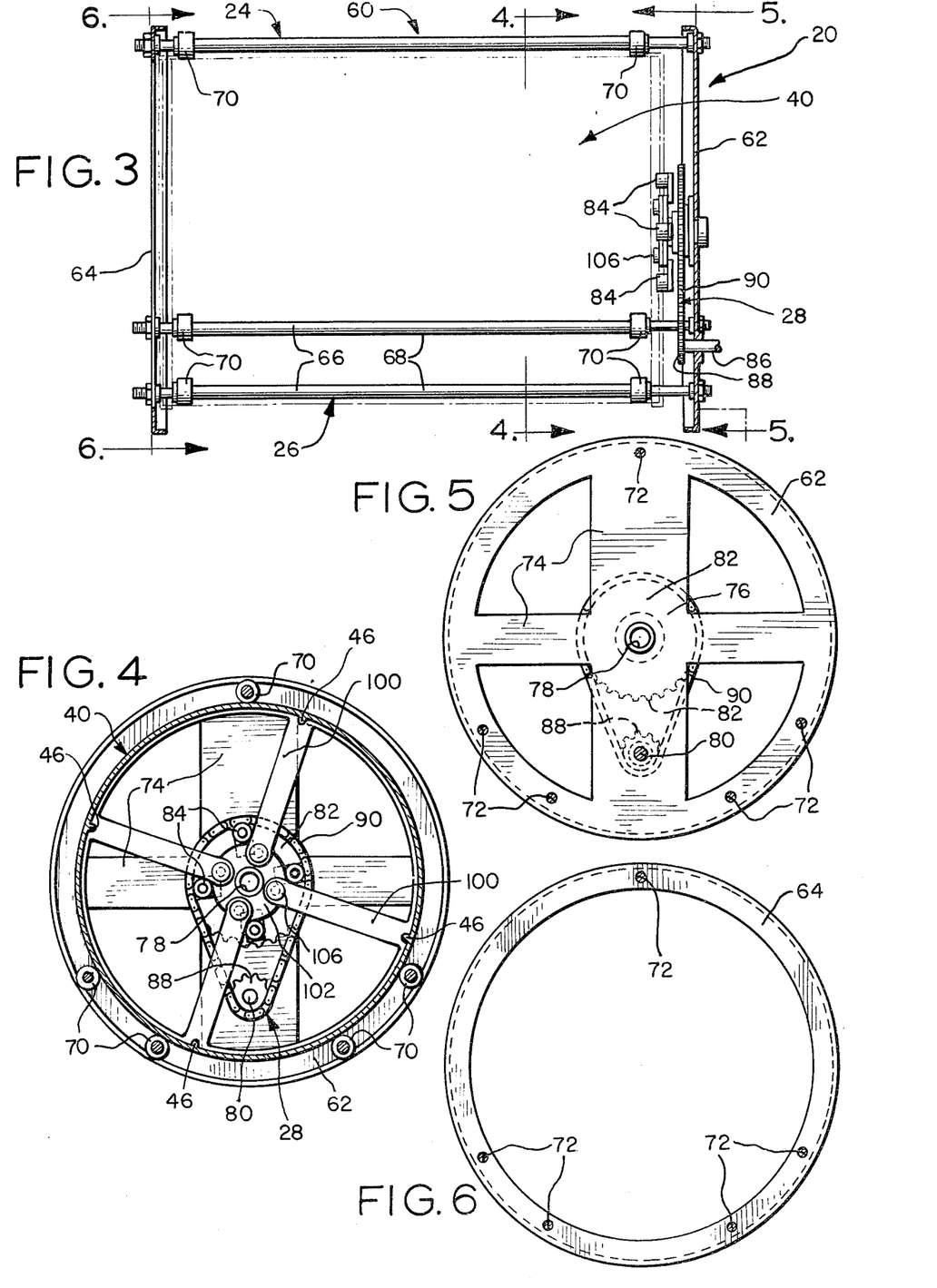
FIG. 3 is a side view of an assembly embodying features of the present invention.
FIG. 4 is a cross-sectional view of the assembly of FIG. 3 taken along lines 4—4.
FIG. 5 is a cross-sectional view of the assembly of FIG. 3 taken along lines 5—5 of FIG. 3.
FIG. 6 is a cross-sectional view of the assembly of FIG. 3 taken along lines 6—6 of FIG. 3.

With reference to the drawings, particularly FIGS. 2 and 3, there is illustrated an assembly embodying features of the present invention, designated generally 20. The assembly consists of rotable food container designated generally 22 and a rotation means designated generally 24. The rotation means 24 includes a means for supporting the rotable food container 22, which support means is designated generally 26, and a drive means designated generally 28. The support means 26 is adapted to be positioned within a suitable enviroment for applying the pressure, heat and rapid cooling or freezing necessary for the cooking process. The drive means 28 is interconnected to the support means 26 and a portion of the drive means 28 may be positioned outside of the cooking environment. The rotable food container 22 would first be loaded with the food to be cooked and then inserted within the support means 26 after which the drive means 28 would be activiated resulting in rotation of the food container 22. When the food container 22 is a cylindrical drum 30 as illustrated, the drum 30 will rotate about its principal axis. Food contained within the drum 30 would ride up the side of the drum 30 until some point above the horizontal center of the drum 30 at which point, under the influence of gravity, the food would fall. This cycle would continue as long as the cylindrical drum 30 is being rotated and results in an improved heat exchange between the food and the temperature variation of the cooking environment during the cooking process.

Figures 1, 8, 10:
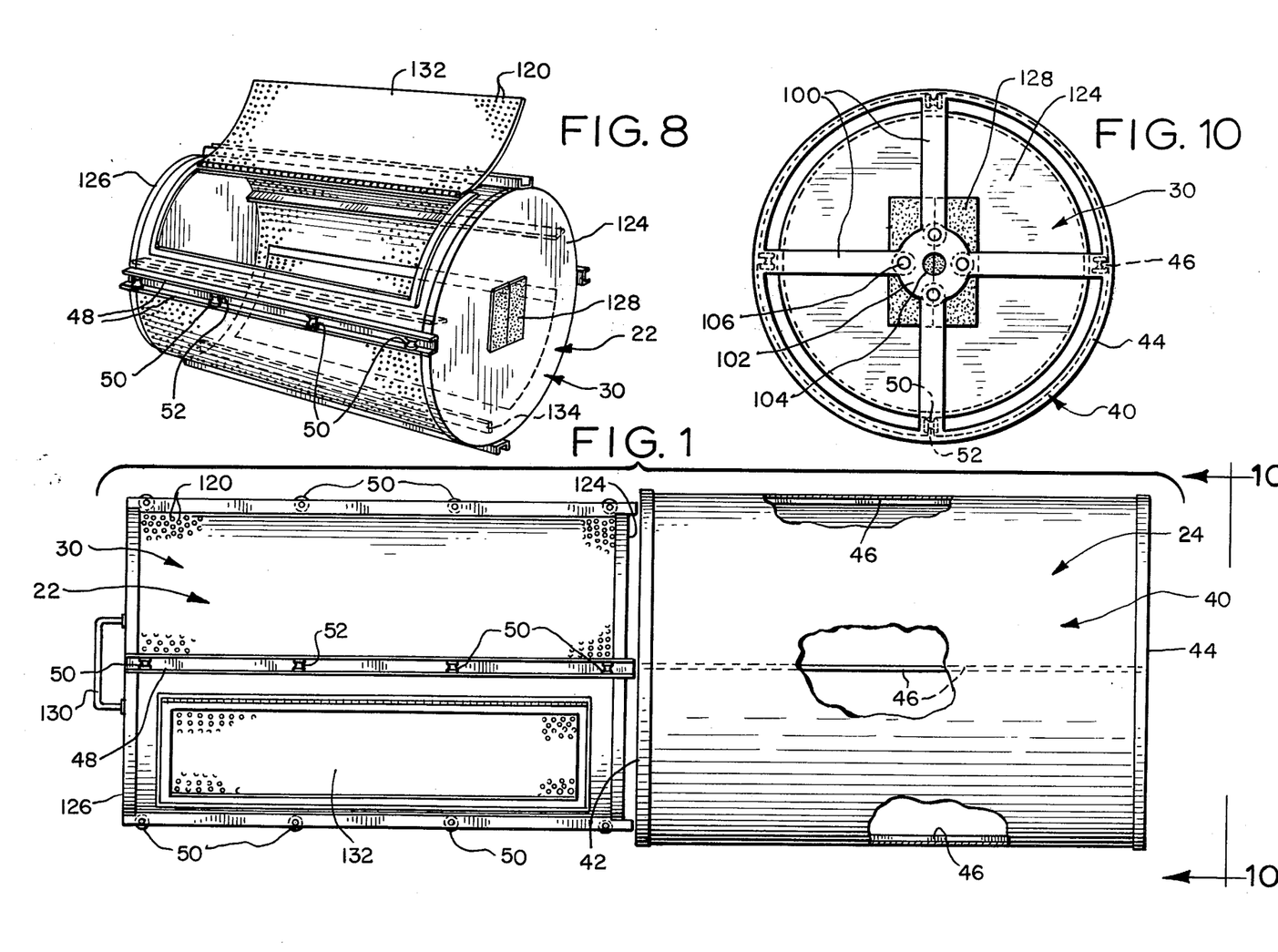
FIG. 1 is a partially cut-away side view of a drum and casing embodying features of the present invention wherein the drum is positioned to be slid into the casing.
FIG. 8 is a perspective view of a drum embodying features of the present invention.
FIG. 10 is an end view of the aligned drum and casing of FIG. 1 taken along lines 10—10 of FIG. 1.

The support means 26, as illustrated is particularly adapted to receive and support a cylindrical drum 30 and includes a drum casing 40 which is also cylindrical in shape. As best seen in FIG. 1, the drum casing 40 is adapted to receive the cylindrical drum 30 in co-axial alignment. The drum casing 40 includes one open-end 42 and a second partially open-end 44 adapted to be interconnected to the drive means 28.

Figure 9:
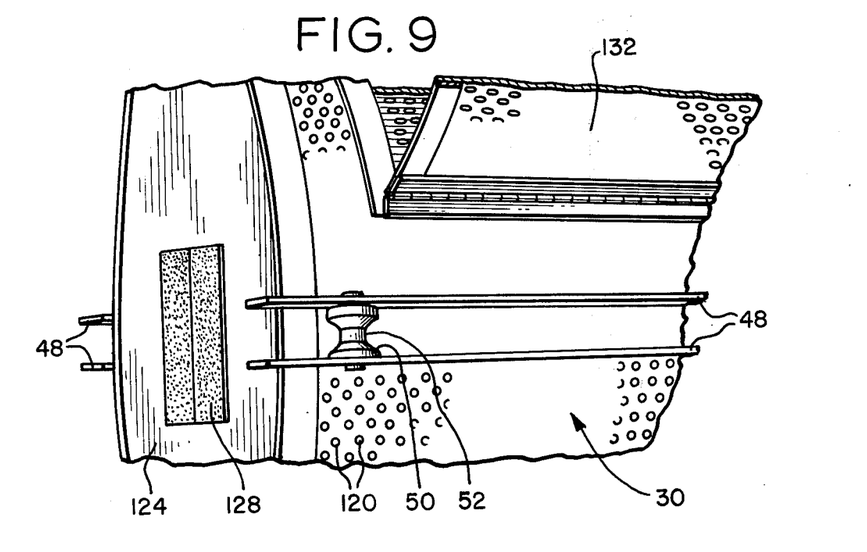
FIG. 9 is a sectional close-up view of the drum of FIG. 8.

Referring now to FIGS. 2, 8 and 9 also, the drum casing 40 includes a plurality of ribs 46 along its inner surface extending from one end 42 to the other end 44. The cylindrical drum 30 includes a plurality of roller guide rails 48 mounted on its exterior surface in parallel alignment to its principal axis and a plurality of rollers 50 mounted within the roller guide rails 48. The rollers, as best seen in FIG. 9, are each mounted rotably on the roller guide rails 48 and include a groove 52 which groove 52 is adapted to receive a rib 46 of the drum casing 40. Each roller guide rail 48 preferably has a plurality of rollers 50 in spaced apart relationship and the roller guide rails 48 are positioned to align with the ribs 46 of the drum casing 40. The cylindrical drum 30 is inserted into the drum casing 40 in such a manner that the ribs 46 of the drum casing 40 slide along the grooves 52 of the rollers 50 allowing the drums 30 to easily be slid into and out of the drum casing 40 and yet be secured stationary to the drum casing 40.

Referring now to FIGS. 2, 3, 4, 5 and 6, the drum casing 40 is supported in a cage portion of the support means 26 that is designated generally 60. The cage 60 includes a first ring 62, a second ring 64, and a plurality of roller bars 66. Each roller bar 66 extends between the first and second rings 62 and 64 is mounted to the rings 62 and 64. As illustrated particularly in FIGS. 2 and 3, a roller bar 66 may consist of tube 68 which is mounted in a conventional manner at each of its ends to the rings 62 and 64, and a plurality of roller bearings 70 which are mounted on the tubes 68 so as to be freely rotable. The roller bars 66 and the rings 62 and 64 are disposed so that the roller bars 66 are positioned horizontally and in spaced-apart parallel relationship such that their roller bearings 70 are positioned in close proximity to the exterior surface of the drum casing 40 when the drum casing 40 is positioned within the cage 60. When the casing 40 is rotated about its principal axis, the rotation will be guided by the freely rotable roller bearings 70 on the roller tubes 68. In a preferred embodiment of the present invention, the cage 60 includes a plurality of roller bars 66 positioned below the horizontal center of the cage 60 and at least one roller bar 66 positioned above the horizontal center of the cage 60. In a more preferred embodiment, the cage 60 includes five roller bars 66, four of which are positioned below the horizontal center of the cage 60 each at a point which marks about a 30° angle from either the horizontal center of the rings 62 and 64 or the vertical center of the rings 62 and 64. The fifth roller bar 66 is positioned above the horizontal center of the cage 60 preferably at the uppermost point on the rings 62 and 64. This preferred alignment of the roller bars 66 is best understood with reference to FIG. 4 which illustrates the position of the roller bars 66 with respect to each other and the horizontal and vertical centers of the cage 60 as represented by the first ring 62. The casing 40 can of course be eliminated if desired by adapting the drum 30 to engage the cage 60 as does the casing 40.

The first and second rings 62 and 64 are approximately equal in circumference and include a plurality of apertures 72 positioned close to their perimeter into which the roller bars 66 are inserted to secure them to the rings 62 and 64. The apertures 72 of one ring are of course positioned so as to be aligned with the apertures 72 on the other ring.

The first ring further includes a plurality of radially extending spokes 74 converge to form a center plate 76. In the preferred embodiment illustrated in the drawings, the radial spokes 74 and center plate 76 of the first ring 62 is formed as an integral unit with the perimeter of the ring 62. The first ring 62 also includes a center bore 78 through which may be inserted a conduit for fluids as will be described for fully below. The first ring 62 may also include a drive shaft bore 80 positioned on one of its radially extending spokes 74. The drive shaft bore 80 faciliates positioning a portion of the drive means 28 outside of the cooking environment while a portion of the drive means 28 is positioned within such environment. Therefore a drive shaft 80 may be extended through the first ring 62 and may interconnect components on the first ring 62 with a source of power.

As best shown in FIG. 2, the first ring 62 has mounted on its center plate 76 a rotable sprocket 82 upon which is mounted a plurality of cam bearings 84. The drive shaft 86 extends through the drive shaft bore 80 and a drive shaft sprocket 88 is mounted on the drive shaft 86 so as to be aligned with the center plate sprocket 82. Referring now to FIG. 5 also, the two sprockets 82 and 88 are interconnected along their periphery by a drive chain 90. The drive shaft 86 is connected to a power source not shown in the drawings which power source, when activated, rotates the drive shaft 86 and the drive shaft sprocket 88 and, by means of the drive chain 90, the center plate sprocket 82 in turn. This rotation causes the cam bearings 84, which are rigidly mounted on the sprocket 82, to rotate also.

As best seen in FIGS. 4 and 10, the second end 44 of the drum casing 40 includes a plurality of radially extending bars 100 which also converge at a center plate 102 and as illustrated in the drawings, the bars 100 and center plate 102 may also be formed integrally. The center plate 102 contains a center aperture 104 also adapted to allow a conduit for fluids to pass through the center. The center plate 102 includes a means for mounting the casing 40 on the cam bearings 84, which mounting means is designated 106. When the casing 40 is mounted on the cam bearings 84, the casing 40 is rotated about its principal axis when the drive means 28 is activated and the drive shaft 86 rotates. The rotation of the casing 40 results in rotation of the cylindrical drum 30 when the cylindrical drum 30 is positioned within the casing 40 as described above.

Referring now particularly to FIGS. 8 and 9, the cylindrical drum 30 is shown as an enclosed container with perforations 120 along its side with a first end and second end designated respectively 124 and 126. The first end 124, in a preferred embodiment, includes a bore (not shown in the drawings) which is aligned with the principal axis of drum 30. The bore may be covered by flexible flaps designated 128 which bore and flaps 128 are adapted to allow a conduit for fluids to be inserted, the flaps 128 parting to allow insertion of such conduits which flaps 128 will then close about the conduit to prevent food within the drum 30 from passing through any space between the bore and the conduit. The second end 126 of the drum 30 is a closed end which preferably may have any suitable handle means 130 mounted thereon. When the first end 124 of the drum placed inwardly of an appropriate vessel, the second end 126 will be positioned outwardly of such vessel and the handle means 130 mounted thereon will faciliate sliding the drum 30 into the casing 40 and removing it therefrom. The drum 30 also includes at least one door means 132 preferably disposed along the sides of the drum 30. As illustrated in FIG. 8, the drum 30 preferably contains two doors 132 positioned at both sides of the drum 30. The drum 30 also preferably includes a plurality of baffles 134 which are mounted on its interior surface and extend from end 124 to end 126 which baffles 134 prevent the food from sliding any substantial distance along the interior surface of the drum 30 when it is being rotated. In a preferred embodiment of the invention, the drum 30 contains at least three internal baffles 134 which extend along the interior of the drum 30 in a spaced apart relationship.

The drum 30 is preferably inserted into the casing 40 so that its first end 124 is positioned in a close proximity to the second end 44 of the drum casing 40 which second end 44 is mounted on the cam bearings 84. In this position, the bore and the flaps 128 of the drum 30 are positioned in close proximity to the center aperture 104 of the drum casing 40 and the center bore 78 of the first ring 62 and all are aligned to allow insertion therethrough of a fluid conduit.

Figure 11:
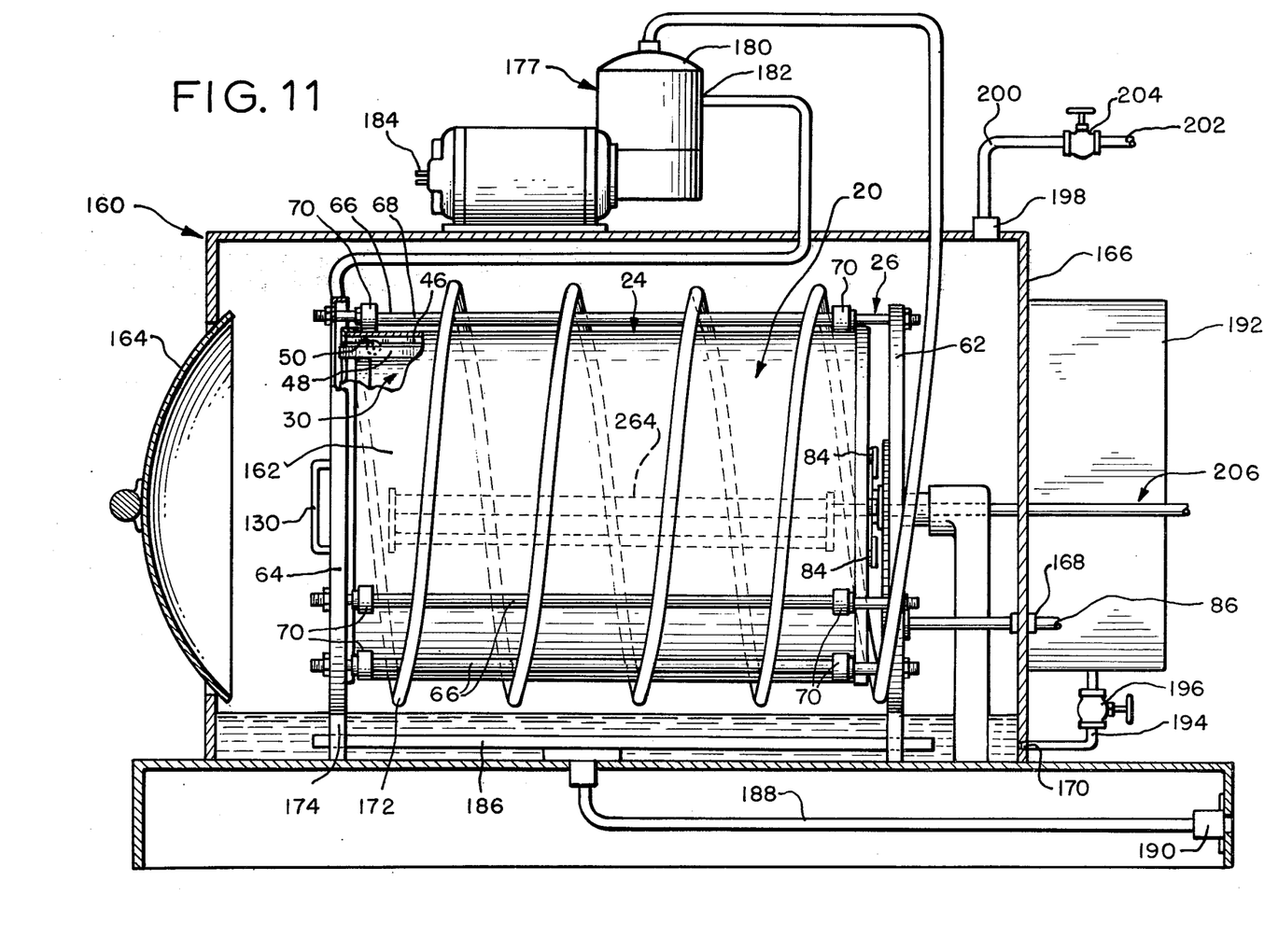
FIG. 11 is a cross-sectional side view of an apparatus embodying features of the present invention.

Referring now to FIG. 11, there is shown a pressure vessel designated generally 160 which pressure vessel 160 includes an internal cooking area 162. The vessel 160 includes a door means 164 and a rear wall 166 positioned opposite the door means 164. The rear wall 166 is adapted to allow any components not situated within the cooking area 162 to be interconnected to internal components. For instance, the rear wall 166 includes a passage 168 through which the drive shaft 86 can pass outwardly of the vessel 160 and a bore 170 through which a conduit for fluids may extend outwardly of the vessel 160. In this embodiment of the invention, the assembly 20 is positioned within a system of coils 172 and the rings 62 and 64 are supported by suitable support means 174 and 176 respectively. The coils 172 in this embodiment are the cooling means and are therefore disposed in close proximity to the assembly 20. A motor compressure unit 177 is connected to the coils 172 as at 180 and 182 to compress and circulate coolant within the coils 172 in the conventional manner and is energized by a suitable electric power source connectable to the same at 184. The cooling means is therefore capable of rapidly reducing the temperature within the cooking area 162 while the food disposed within the assembly 20 is falling intermittently through the air which rapid cooling is a step of the process of the present invention.

The heating means of the embodiment illustrated in FIG. 1 comprises an electrical heating element 186 positioned at the bottom of the cooking area 162 and which is suitably connected by a cord 188 to a source of electric current 190. The heating element 186 is disposed within a water reservoir 192 which contains water which can be introduced through a conduit 194 into the cooking area 162 and the water level can be manually controlled by a valve 196.

The means for pressurizing the vessel 160, as illustrated in FIG. 11, includes a fitting 198 to which a conduit 200 is connected for receipt of air, inert gas such as hydrogen or helium, or other suitable pressurized fluid from a source (not shown) in communication with a conduit 202. A manually operable valve 204 permits the introduction or release of pressure to or from the cooking area 162.

The power source (not shown) for the drive means 28 is positioned outside of the pressure vessel 160 and is interconnected to the drive shaft 86 shown extending through the rear wall 166 of the pressure vessel 160. Also shown in FIG. 11 is a conduit 206 also extending outward of the pressure vessel 160 through the rear wall 166. This conduit interconnects a fluid source (not shown) with a manifold (not shown) positioned within the assembly 20. In the embodiment illustrated in FIG. 11, such a conduit 206 and manifold would be an optional feature for allowing fluids to be dispersed within the center of the assembly 20, that is, within the drum 30. Although there are illustrated pressure means, cooling means, and heating means all disposed without the assembly 20, the manifold positioned within the drum 30 can be adapted to supply an alternate source of cooling or freezing or heating. For instance, free steam can be transmitted within the drum 30 by means of the manifold conduit 206 where free steam could be the sole or additional source of heating. The manifold conduit 206 and manifold could also be adapted to supply a cooling agent, such as cool water within the drum 30 as the sole, alternate, or additional cooling means. Alternatively the conduit 206 and the manifold could be adapted to supply a freezing agent to the inside of the drum, which freezing agent could supply both the cooling and freezing of the process or could be used as an alternate source of cooling or could be used as an agent for freezing after cooling has been effectuated by means of the coils 172.

Figure 7:
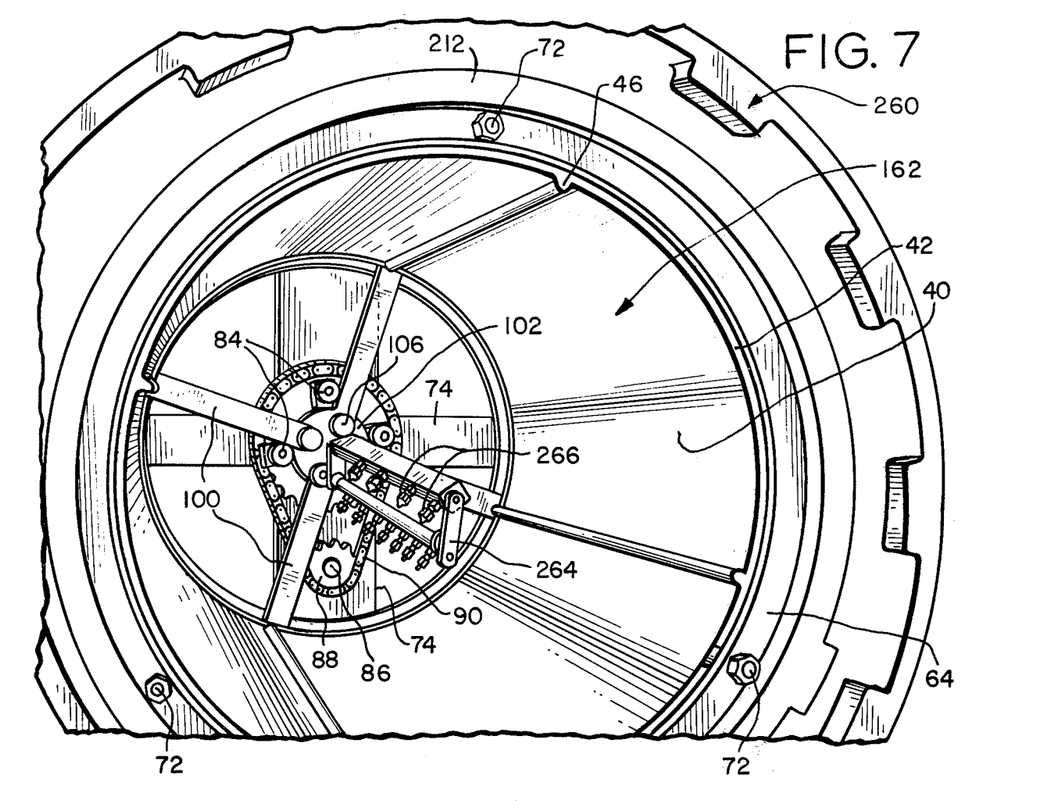
FIG. 7 is a perspective view of an apparatus embodying features of the present invention.

Referring now to FIG. 7, there is illustrated the assembly 20 prior to insertion of the cylindrical drum 30 which assembly 20 is disposed within a pressure vessel 260. The pressure vessel 260 is a generally cylindrical autoclave with a rear end (not shown) and an open-end 262 which open-end is provided with a door means (not shown). The embodiment of FIG. 8 is provided with a manifold 264 which is adapted to be interconnected to a manifold conduit (not shown) which conduit extends through first the center aperture 104 of the drum casing 40, the center bore 76 of the first ring 62 of the cage 60 and a bore (not shown) in the rear wall of the pressure vessel 260. The manifold 264 includes a plurality of spray nozzles 266 which are adapted for spraying fluids. One embodiment of the present invention, the nozzles 266 of the manifold are adapted to spray steam for heating purposes and cooling water (40° F.) for cooling purposes into the center of the assembly 20 which free steam and water is provided from a conventional source positioned outside the vessel 260. In another embodiment of the present invention, the conduit (not shown) interconnecting the manifold 264 is adapted to transmit, at different times, a free steam for heating and/or a suitable cryogenic material for freezing to the center of the assembly 20. The centered manifold 264 of course could be replaced with means for transferring heat and/or cooling agents disposed outside of the drum 30, such as steam jets, if desired.

A typical construction of the assembly 20 as seen disposed within the pressure vessel 260 in FIG. 8 would include first positioning the first ring 62 of the cage 60 in a rigidly mounted position in close proximity to the back wall of the pressure vessel 260. The roller bars 62 would then be secured through the appropriate apertures 72 on the first ring 62. The second ring 64 would then be secured to the opposite ends of the roller bars 66 and secured thereto through the appropriate apertures 72 on the second ring 64. The drive shaft 86 would then be inserted through the drive shaft bore 80 of the first ring 62 from without. The pressure vessel 260 and the drive shaft sprocket 88 would then be connected to the end of the drive shaft 86 which is inward of the pressure vessel 260. The drive chain 90 would then be mounted on the periphery of both the drive shaft sprocket 88 and the sprocket 82 mounted on the first ring 62. The drum casing 40 would then be inserted into the cage 60 so that the roller bearings 70 mounted on the tubes 68 of the roller bars 60 would substantially abut the adjacent surface of the casing 40. The second end 44 of the casing 40, which is adapted to be mounted on the cam bearings 84 which are in turn mounted on the sprocket 82, would thereby be interconnected and adapted to be rotated by the drive means 28. The manifold conduit would be inserted through the center bores of the components from outside the pressure vessel 260, inwardly to the assembly 20. The manifold 264 would then be inserted in the open-end 262 of the pressure vessel 260 and interconnected to the manifold conduit. The cylindrical drum 30 would then be inserted into the assembly 20 and rigidly secured to the casing 40 by means of engagement of the rollers 50 of the drum 30 and the ribs 46 of the drum casing 40. The flaps 128 of the drum 30 would be sufficiently flexible to allow the manifold 264 to pass therethrough and through the bore at the first end 124 of the drum 30 which bore is of sufficient diameter to allow the entire manifold 164 to pass into the drum 30. The flaps 128, after the manifold 264 has passed through, would then return to a partially closed position and lay in close proximity to that portion of the manifold conduit with which it is aligned. The door of the vessel would then be closed and the cooking process commenced.

Pressure would be supplied to the pressure vessel 260 or any suitable means not shown and the drive means 28 for the assembly 20 would be activated. Steam would then be introduced through the manifold 264 while the rotation of the food within the drum 30 is continued. The steam supply would be deactiviated at an appropriate time well known to those of ordinary skill in the art and subsequent thereto, cool water and/or cryogenic freezing materials would be introduced by way of the same manifold 264 into the interior of the drum 30. The pressure vessel 260 would be depressurized after the food reaches a temperature 100° F. or less. The rotation of the food may be discontinued at any time desired during the process but in a preferred embodiment of the present invention, the rotation of the food continues until the completion of the cooling or freezing.

The present invention includes an assembly 20 disposed within a pressure vessel 260 which is adapted to supply heat and cooling to the environment surrounding the assembly while subjected to above atmospheric pressures and the present invention also includes a process for cooking food wherein heat and cooling is supplied to food subjected to above atmospheric pressures while the food is disposed within a rotating food container 22 and is thereby caused to fall intermittently through the atmosphere. The means for supplying the pressure, heat and cooling to the apparatus is not limited to the means illustrated herein and other suitable means for supplying pressure, heat, and cooling or freezing contemplated by the present invention are within the ordinary skill of one in the art. The present invention also includes an assembly 20 for rotating a food container 22 which permits the food contained within such container 22 to fall intermittently through the air thereby increasing the heat exchange between the food and the environment, which assembly 20 is adapted to be disposed within a suitable vessel to which pressure, heat and cooling or freezing may be supplied.

The present invention also includes an assembly 20 and process wherein food may be disposed within a rotable food container 22 and caused to fall intermittently through the atmosphere, increasing the heat exchange and allowing a greater bulk of food to be processed per volume capacity of a given vessel. For instance, when a vessel 260 such as shown in FIG. 7 is utilized, the prior art practice is to support the food on a plurality of trays disposed in space apart relationship within the vessel 260. The capacity of vessel 260 depends upon placement of the trays in a minimum spaced apart relationship which still allows sufficient circulation to provide some uniformity regarding cooking and cooling to all of the food within the vessel 260. When the same vessel 260 was adapted to include the assembly 20 illustrated in FIG. 7, the capacity of the vessel 260 with respect to the bulk of food that could be processed during one cycle was increased 50 percent while the overall uniformity of cooking was improved over the prior art practices.

It should be understood that the process and assembly and apparatus of the present invention may be adapted to other configurations and may be modified without departing from the spirit of the present invention has been embodied in the following claims.

I claim:

1. An assembly for increasing heat exchange with respect to food to be cooked within a pressure vessel comprising:
   a pressure vessel; and
   a rotatable cylindrical food container within said pressure vessel and means for rotating said food container;
   said food container being adapted so as to subject food within to the pressure and temperature atmospheric conditions applied within said pressure vessel and having a plurality of roller guide rails mounted on its exterior surface parallel to its principal axis and having a plurality of rollers mounted on said rails;
   a cylindrical casing having a plurality of ribs mounted on its interior surface, said food container rollers receiving said ribs whereby said drum and said drum casing are disposed is co-axial alignment and the casing slideably receives the drum;
   means for supporting said cylindrical casing including a first and second ring mounted within said pressure vessel in spaced-apart co-axial alignment and a plurality of roller bars extending between said first and second ring and rotatably mounted thereto for supporting said cylindrical casing, said roller bars disposed in substantially abutting relationship to said cylindrical casing; and
   means for tumbling the food in said food container during rotation of said food container in order that at least a substantial part of the food is allowed to fall through ambient atmosphere within said food container so whereby heat exchange occurs between the food and the atmospheric conditions applied within said pressure vessel.

2. The assembly of claim 1 wherein said rotation means includes:
   a drive assembly adapted to rotate said cylindrical food container.

3. The assembly of claim 2 wherein said roller bars are mounted on said first and second rings so that a plurality of said bars are disposed below the horizontal center of said raings and at least one roller bar is disposed above the horizontal center of said rings.

4. The assembly of claim 3 wherein said cylindrical food container is a drum which includes door means for introducing and removing food, and end aperture for introduction of a conduit for heat or cooling agents, and a means for preventing escape of food through said end aperture.

5. The assembly of claim 4 wherein:
   said first ring includes a plurality of radially extending spokes and a ring center plate, said center plate being secured to said radial extending spokes and said center plate including a rotatably mounted first sprocket, said first sprocket including a plurality of cam bearings;
   said casing includes, at one end, a plurality of radial extending bars and a casing center plate, said casing center plate being mounted on said sprocket of said ring center plate and aligned therewith so that the bars are positioned adjacent to said cam bearings; and
   said drive means includes a motor, a drive shaft driven by said motor, a second sprocket mounted on said drive shaft, and a drive chain interconnecting said first sprocket and said second sprocket.

6. An improved apparatus for cooking moisture containing food comprising:
   pressure vessel;
   means for introducing gas under pressure into said vessel;
   means for heating the interior of said vessel;
   means for rapidly cooling the interior of said vessel;
   means for causing food disposed within the vessel to be lifted and then to fall through the atmosphere including a cylindrical drum in heat exchange communication with conditions applied within said pressure vessel and a drum casing, wherein said cylindrical drum has a plurality of roller guide rails mounted on its exterior surface parallel to its principal axis and a plurality of rollers mounted on said rails and said casing has a plurality or ribs mounted on its interior surface, said rollers being adapted to receive said ribs to dispose said drum and said drum casing in co-axial alignment, and means for rotating said drum casing; and
   said rotation means including a drive assembly adapted to rotate said drum casing and a support means including a first and second ring mounted within said pressure vessel in spaced-apart co-axial alignment and a plurality of roller bars extending between said first and second ring and rotatably mounted thereto.

7. The apparatus of claim 6 wherein said cylindrical drum is a perforated cylindrical drum.

8. The apparatus of claim 6, wherein said roller bars are mounted on said first and second rings so that at least four of said bars are disposed below the horizontal center of said rings and at least one roller bar is disposed above the horizontal center of said rings.

9. The apparatus of claim 8 wherein said drum includes door means for introducing and removing food and an end aperture for introduction of a conduit for heating or cooling agents, and flaps to prevent escape of food through said end aperture.

10. The apparatus of claim 9 wherein:
    said first ring includes a plurality of radially extending spokes ending in a ring center plate, said ring center plate including a rotatably mounted first sprocket, said first sprocket including a plurality of cam bearings;
    said casing includes, at one end, a plurality of radial extending bars ending in a casing center plate, said center plate being mounted on said first sprocket and disposed so that the bars are positioned adjacent to said cam bearings; and said drive means includes a motor, a drive shaft driven by said motor, a second sprocket mounted on said drive shaft, and a drive chain interconnecting said first sprocket and said second sprocket.

11. The apparatus of claim 9 wherein said conduit supplies free steam into the pressure vessel.

12. The apparatus of claim 9 wherein said conduit supplies cool water into the pressure vessel.

13. The apparatus of claim 8 wherein the heating means is disposed without the cylindrical drum.

14. The apparatus of claim 8 wherein the cooling means is disposed without the cylindrical drum.

15. The assembly of claim 1 wherein said cylindrical food container includes at least one internal baffle to facilitate tumbling of food in said food container.

16. The assembly of claim 15 wherein said cylindrical drum is perforated to facilitate heat exchange between said food and said atmospheric conditions applied within said pressure vessel.

* * * * *

UNITED STATES PATENT AND TRADEMARK OFFICE
CERTIFICATE OF CORRECTION

PATENT NO. : 4,157,061                    Page 1 of 3
DATED      : June 5, 1979
INVENTOR(S) : Albert F. Margus, Jr.

It is certified that error appears in the above-identified patent and that said Letters Patent are hereby corrected as shown below:

Col. 1, line 54, insert --a-- after the word is.

Delete "rotable" and insert --rotatable-- therefore in the following instances:

Col. 2, line 7
    Col. 2, line 36
    Col. 2, line 67
    Col. 3, line 5
    Col. 3, line 31
    Col. 3, line 34
    Col. 3, line 36
    Col. 3, line 52
    Col. 3, line 53
    Col. 3, line 63
    Col. 3, line 63
    Col. 3, line 66
    Col. 4, line 3
    Col. 4, line 5
    Col. 4, line 6
    Col. 4, line 42
    Col. 4, line 44
    Col. 4, line 46
    Col. 4, line 49
    Col. 4, line 59
    Col. 5, ling 33
    Col. 5, line 36
    Col. 5, line 44

UNITED STATES PATENT AND TRADEMARK OFFICE
CERTIFICATE OF CORRECTION

PATENT NO. : 4,157,061
DATED : June 5, 1979
INVENTOR(S) : Albert F. Margus, Jr.

It is certified that error appears in the above-identified patent and that said Letters Patent are hereby corrected as shown below:

Col. 6, line 28
        Col. 6, line 36
        Col. 7, line 13
        Col. 10, line 67

Col. 2, line 63, delete the words "through out" and insert --throughout-- therefor.

Col. 4, line 2, delete "nozzels" and insert --nozzles-- therefor.

Col. 4, line 50, delete "postioned" and insert --positioned-- therefor.

Col. 6, line 6, delete "rotably" and insert --rotatably-- therefor.

Col. 11, line 5, delete "space" and insert --spaced-- therefor.

Col. 11, line 40, delete "is" and insert --in-- therefor.

UNITED STATES PATENT AND TRADEMARK OFFICE
CERTIFICATE OF CORRECTION

PATENT NO. : 4,157,061            Page 3 of 3
DATED : June 5, 1979
INVENTOR(S) : Albert F. Margus, Jr.

It is certified that error appears in the above-identified patent and that said Letters Patent are hereby corrected as shown below:

Col. 11, line 64, delete "raings" and insert --rings-- therefor.

Col. 12, line 36, delete "or" and insert --of-- therefor.

Signed and Sealed this

Sixth Day of November 1979

[SEAL]

Attest:

RUTH C. MASON
*Attesting Officer*

LUTRELLE F. PARKER
*Acting Commissioner of Patents and Trademarks*